US010099377B2

(12) United States Patent
Freeman et al.

(10) Patent No.: US 10,099,377 B2
(45) Date of Patent: Oct. 16, 2018

(54) METHODS AND SYSTEMS PROVIDING MISALIGNMENT CORRECTION IN ROBOTS

(71) Applicant: Applied Materials, Inc., Santa Clara, CA (US)

(72) Inventors: Gregory J. Freeman, Austin, TX (US); Marvin L. Freeman, Round Rock, TX (US); Adam Cranmer, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 190 days.

(21) Appl. No.: 15/197,039

(22) Filed: Jun. 29, 2016

(65) Prior Publication Data

US 2018/0001478 A1    Jan. 4, 2018

(51) Int. Cl.
*B25J 9/16* (2006.01)
*B25J 9/00* (2006.01)
*B25J 9/04* (2006.01)

(52) U.S. Cl.
CPC ........... *B25J 9/1692* (2013.01); *B25J 9/0087* (2013.01); *B25J 9/043* (2013.01); *G05B 2219/39033* (2013.01)

(58) Field of Classification Search
CPC ............ B25J 9/0087; B25J 9/1692; G05B 2219/39033; G05B 15/02; H01L 21/68707; H01L 21/67265; G06F 16/00
See application file for complete search history.

(56) References Cited

U.S. PATENT DOCUMENTS

| 5,844,683 | A | 12/1998 | Pavloski et al. |
| 6,522,942 | B2* | 2/2003 | Kondo .............. H01L 21/67259 318/568.16 |
| 6,556,887 | B2 | 4/2003 | Freeman et al. |
| 6,629,053 | B1 | 9/2003 | Mooring |
| 7,039,501 | B2 | 5/2006 | Freeman et al. |
| 7,107,125 | B2 | 9/2006 | Yim et al. |
| 7,319,920 | B2 | 1/2008 | Donoso et al. |
| 7,792,350 | B2 | 9/2010 | Kiley et al. |
| 7,894,657 | B2 | 2/2011 | Van der Meulen et al. |

(Continued)

FOREIGN PATENT DOCUMENTS

| CN | 103972135 | 8/2014 |
| EP | 0 597 637 | 5/1994 |
| WO | WO 99/59056 | 11/1999 |

OTHER PUBLICATIONS

International Search Report and Written Opinion of International Application No. PCT/US2017/036904 dated Sep. 4, 2017.

*Primary Examiner* — Rachid Bendidi
(74) *Attorney, Agent, or Firm* — Dugan & Dugan, PC

(57) ABSTRACT

Methods of correcting positional misalignment of blades in robots, such as dual-bladed robots, are described. The methods include, in one or more embodiments, a robot including moveable arms and an end effector attached to one of the moveable arms, a flag disposed on one of the moveable arms or the end effector, a chamber adapted to be serviced by the end effector, a beam sensor positioned at a distance from the chamber, and correcting misalignment of the end effector wherein the misalignment occurs between an initial linear center-finding location and the estimated center of the chamber. Systems of such electronic device calibration are also disclosed. Numerous other aspects are provided.

22 Claims, 9 Drawing Sheets

(56) References Cited

U.S. PATENT DOCUMENTS

| | | | |
|---|---|---|---|
| 8,041,450 B2* | 10/2011 | Takizawa | H01L 21/68707 700/214 |
| 8,064,070 B2 | 11/2011 | Schauer | |
| 8,215,890 B2 | 7/2012 | Tseng et al. | |
| 8,768,513 B2* | 7/2014 | Cox | H01L 21/67742 700/1 |
| 9,334,127 B2 | 5/2016 | Kremerman et al. | |
| 9,378,994 B2 | 6/2016 | Weaver et al. | |
| 2002/0002422 A1 | 1/2002 | Kondo et al. | |
| 2003/0012631 A1 | 1/2003 | Pencis et al. | |
| 2003/0014157 A1* | 1/2003 | Freeman | B25J 9/0009 700/218 |
| 2004/0199291 A1* | 10/2004 | Freeman | B25J 9/0009 700/258 |
| 2005/0021177 A1* | 1/2005 | Bacchi | B25J 9/1692 700/245 |
| 2005/0111956 A1* | 5/2005 | van der Meulen | B25J 9/042 414/744.2 |
| 2005/0118010 A1* | 6/2005 | Ogawa | B25J 9/009 414/744.1 |
| 2005/0137751 A1 | 6/2005 | Cox et al. | |
| 2009/0024241 A1 | 1/2009 | Rice et al. | |
| 2009/0093906 A1* | 4/2009 | Takizawa | H01L 21/67265 700/214 |
| 2009/0182454 A1 | 7/2009 | Donoso et al. | |
| 2010/0019431 A1 | 1/2010 | Macleod et al. | |
| 2013/0039726 A1 | 2/2013 | Brodine et al. | |
| 2013/0041505 A1 | 2/2013 | Cox | |
| 2014/0271050 A1 | 9/2014 | Weaver et al. | |
| 2014/0271055 A1 | 9/2014 | Weaver et al. | |

\* cited by examiner

METHODS AND SYSTEMS PROVIDING MISALIGNMENT CORRECTION IN ROBOTS

FIELD

Embodiments of the present disclosure relate to methods and apparatus adapted to correct misalignment of end effectors in robots.

BACKGROUND

Electronic device manufacturing systems may include multiple process chambers and load lock chambers. Such chambers may be included in cluster tools where a plurality of process chambers may be distributed about a transfer chamber, for example. These tools may employ articulated robots or multi-arm robots, which may be housed within the transfer chamber and transport substrates between the various process chambers and load lock chambers. For example, the robot may transport substrates from chamber to chamber, from load lock chamber to process chamber, and/or from process chamber to load lock chamber. Efficient and precise transport of substrates between the various system chambers may improve system throughput, thus lowering overall operating costs.

Furthermore, precise substrate placement may improve overall processing quality. In many dual-bladed robots, Selective Compliant Articulated Robot Arm (SCARA) robots are employed. Each SCARA robot employs three arms (upper arm, forearm, and wrist) driven by one motor. An end effector may be coupled to the wrist and may be used to carry a substrate to or from a pick or place destination such as a process chamber or a load lock chamber. In dual-bladed SCARA robots, where a SCARA robot is coupled to opposite ends of a boom, problematically, such SCARA robots may suffer from certain misalignment problems. Additionally, in SCARA robots that are not dual-bladed, certain misalignment problems may also occur.

Accordingly, this disclosure is directed at improved methods, systems, and apparatus for efficient and precise orientation of end effectors.

SUMMARY

In one embodiment, a method of correcting misalignment in a dual-bladed robot is provided. The method includes providing a dual-bladed robot including first moveable arms and a first end effector attached to a one of the first moveable arms, and second moveable arms and a second end effector attached to a one of the second moveable arms, wherein the first end effector and the second end effector are independently moveable in extension, providing first flags on one of the first moveable arms or the first end effector, providing second flags on one of the second moveable arms or the second end effector, providing first beam sensors at locations in an expected path of the first flags, providing second beam sensors at locations in an expected path of the second flags, extending the robot in a first robot configuration with the first end effector extended and with the second end effector retracted and recording measured positions in space where the first beam sensors are blocked and unblocked by the first flags, extending the robot in a second robot configuration with both of the first end effector and the second end effector extended and recording the measured positions in space where the first beam sensors are blocked and unblocked by the first flags and where the second beam sensors are blocked and unblocked by the second flags, and determining a position correction for at least one of the first robot configuration and the second robot configuration.

In another embodiment, a dual-bladed robot calibration system is provided. The dual-bladed robot calibration system includes the dual-bladed robot including first moveable arms and a first end effector attached to one of the first moveable arms, and second moveable arms and a second end effector attached to one of the second moveable arms, wherein the first end effector and second end effector are independently moveable, first flags disposed on one of the first moveable arms or the first end effector, second flags disposed on one of the second moveable arms or the second end effector, first beam sensors provided proximate to a first process location, second beam sensors provided proximate to a second process location, a controller coupled to the dual-bladed robot and operatively configured to move the dual-bladed robot to a first robot configuration with the first end effector extended and the second end effector retracted and record measured positions where the first beam sensors are blocked and unblocked by the first flags, move the dual-bladed robot to a second robot configuration with both of the first end effector and the second end effector extended and record the measured positions where the first beam sensors are blocked and unblocked by the first flags and where the second beam sensors are blocked and unblocked by the second flags, and determine a position correction for at least one of the first robot configuration and the second robot configuration.

In another embodiment, an electronic device processing system is provided. The system includes a robot including moveable arms and an end effector attached to one of the moveable arms, and a flag disposed on one of the moveable arms or the end effector, wherein the end effector is moveable in translation, a chamber adapted to be serviced by the end effector, a beam sensor positioned at a distance from the chamber, a controller coupled to the robot and operatively configured to cause movement of the robot to a robot configuration with the end effector extended and record blocked and unblocked transition locations where the beam sensor is blocked and unblocked by the flag, and determine a position correction relative to a calibrated position for the robot configuration.

In yet another embodiment, a method of correcting misalignment in a robot is provided. The method includes providing a robot including moveable arms and an end effector attached to one of the moveable arms, and a flag disposed on one of the moveable arms or the end effector, providing a chamber adapted to be serviced by the end effector, providing a beam sensor positioned at a distance from the chamber, moving the robot to a robot configuration with the end effector extended, recording blocked and unblocked transition locations where the beam sensor is blocked and unblocked by the flag, and determining a position correction relative to a calibrated position for the robot configuration.

Numerous other features are provided in accordance with these and other aspects of the disclosure. Other features and aspects will become more fully apparent from the following detailed description, the appended claims, and the accompanying drawings.

DETAILED DESCRIPTION

Figure 1A:
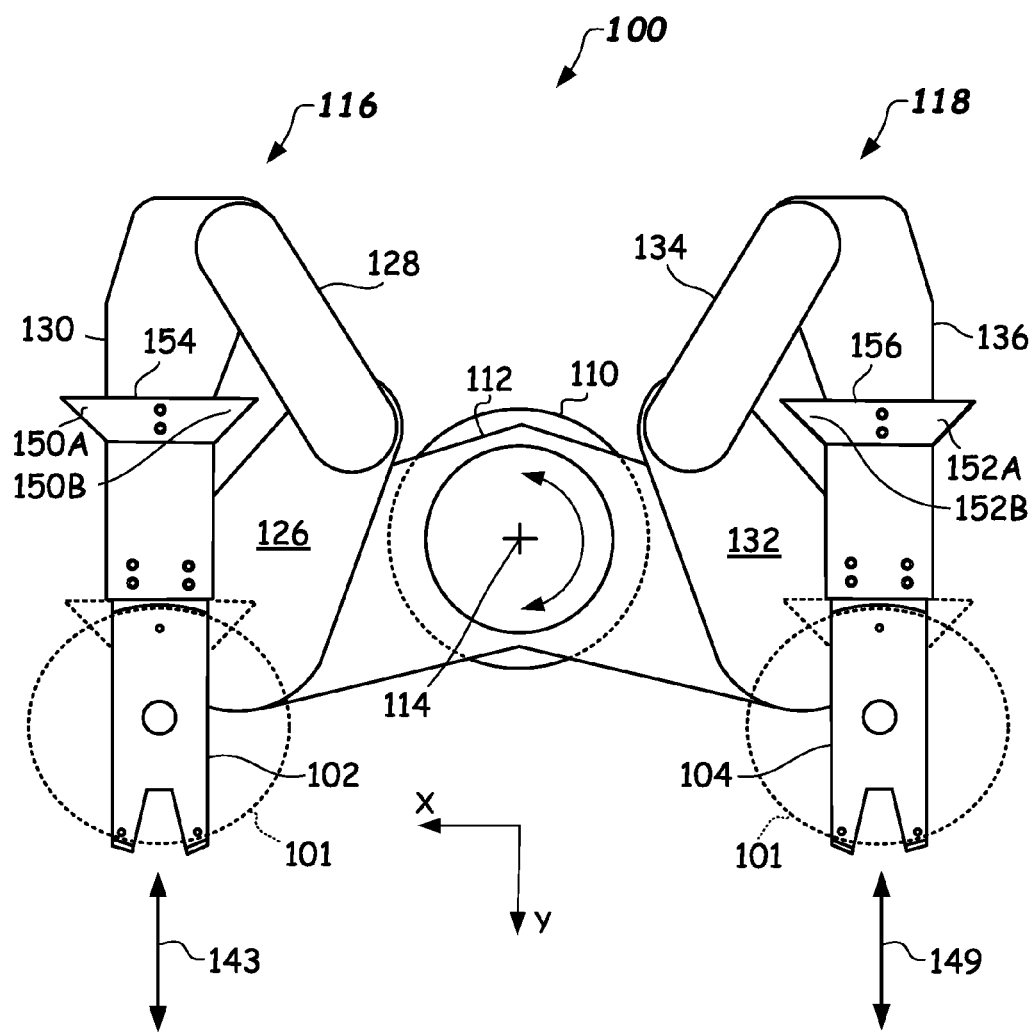
FIG. 1A illustrates a top plan view of a dual-bladed robot including calibration-assisting flags according to one or more embodiments.

For the aforementioned reasons, in electronic device manufacturing it is a goal to achieve very precise and rapid transport of substrates between various locations. In particular, each blade of a dual-bladed robot should be oriented precisely relative to the chambers that they service (e.g., process chambers and/or load-lock). Improper positioning may result in uneven processing, possibly with quality being diminished in some embodiments or misaligned handoffs. As mentioned above, some dual-bladed SCARA robots suffer from certain orientation problems.

In particular, the inventors herein have discovered that when a single end effector is individually extended into a process chamber by itself, the positional orientation of that end effector in the process chamber is different than when both end effectors are simultaneously extended into process chambers at the same time, as each robot configuration includes a different amount of droop. The different amounts of droop appear to cause different amounts of horizontal and/or rotational misalignment, depending upon whether one blade is extended or two.

Moreover, in the prior art, as the end effectors with supported substrates are moved into the chambers past the center-finding sensors, the center location of the substrates are determined at the sensor location. As such, adjustments in end effector positioning can be accomplished when the substrate is not centered on the end effector, so as to improve the substrate positioning within the chamber. However, the inventors have discovered that the end effector encounters further offset/misalignment from the intended location as the end effector moves from the center-finder location to the center location of the chamber. Thus, even though some correction of improper centering may be accomplished in the prior art, further misalignment occurs as the end effector and supported substrate travel between the center-finding location and the chamber. Such misalignment is not corrected for in the prior art. Accordingly, orientation of substrates in process chambers may be less than optimal. Therefore, in one or more embodiments, a method of improving misalignment correction is provided, wherein at least some misalignment that occurs between the center-finding location and the center of the chamber (e.g., process chamber) is corrected.

In one embodiment, misalignment under the different robot extension configurations is accounted for during the calibration process. In particular, without correction of this dichotomy, at least some of the time, some positional error may be present, depending upon whether the initial positional calibration was performed with one end effector extended or both end effectors extended.

Therefore, in a first aspect, one or more embodiments of the present disclosure are directed at a method of precisely calibrating a dual-bladed robot. In some embodiments, positional misalignment is corrected regardless of whether one or both of the end effectors are extended in to a process chamber at a time. Furthermore, robot calibration systems and electronic device processing systems for carrying out the methods are described herein.

Further details of example embodiments are described with reference to FIG. 1A through FIG. 4 herein.

FIGS. 1A-1E illustrate various diagrams of example embodiments of a dual-bladed robot 100 including multiple robot arms. The dual-bladed robot 100 and calibration method may have utility for transferring substrates between various chambers (e.g., process chambers and/or load lock chambers) in an electronic device processing system 200 as shown in FIGS. 2A-2C, for example, wherein precision of placement of the substrate may be improved. Accordingly, processing quality may also be improved. Some embodiments of the misalignment correction method may have applicability to even single bladed robots.

The dual-bladed robot 100 may be adapted to precisely pick or place substrates 101 (shown dotted), supported on a first end effector 102 and a second end effector 104, to or from a target destination. The target destination may be an ideal placement location in one or more process chambers 206 (see FIGS. 2A-2C), such as a physical center thereof. Furthermore, the dual-bladed robot 100 may pick or place substrates 101, from or to, one or more load lock chambers 208 as the target location. The substrates 101 may be semiconductor substrates including patterned or unpatterned substrates, masked substrates, flat panel display glass, solar cells, silica-containing panels, silica-containing plates or discs, or other like electronic device substrates or silica-containing precursor articles.

The dual-bladed robot 100 may also include a base 110 configured and adapted to be attached to a wall (e.g., a floor) of a transfer chamber 247 (FIG. 2A), for example. The attachment to the wall may be by suitable fasteners, such as screws, bolts, or the like. The base 110 may be sealed to the wall in one or more embodiments, such as when a vacuum is provided in the chamber. The dual-bladed robot 100 may include a boom 112 that is rotatable about a central axis 114 (e.g., centered on the boom 112), and first and second SCARA robots 116, 118 mounted to the boom 112, such as at the outboard ends thereof. However, other types of robots, including other dual-bladed robots and even single-bladed robots, may benefit from the misalignment correction methods, systems, and apparatus described herein.

In more detail, the boom 112 in the depicted embodiment may be a substantially rigid cantilever beam. The boom 112 may be rotated in an X-Y plane about the central axis 114 in either a clockwise or counterclockwise rotational direction to move the dual-bladed robot 100 to another radial position to service another from the group of process chambers 206 that are twinned, or load lock chambers 208 that are also twinned. Twinned chambers are provided in a side-by-side orientation, wherein the chambers are coupled to a common facet provided in one plane.

The rotation of the boom 112 about the central axis 114 may be provided by any suitable boom drive assembly, including a first motor 115 driving a boom shaft 117 (FIG. 1E), wherein the boom shaft 117 is rigidly coupled to the boom 112. The boom drive assembly may be at least partially received in a motor housing 120 (FIG. 1D). The first motor 115 may be a stepper motor, variable reluctance electric motor, or permanent magnet electric motor, for example. Other suitable types of motors may be used. A first encoder 115E (FIG. 1D) may provide feedback of the rotational position of the first motor 115, which then may be translated kinematically to positioning of a first end effector 102 and a second end effector 104, dependent on the degree of extension of each of the first and second end effectors 102, 104.

The rotation of the boom 112 may be controlled by suitable drive signals to the first motor 115 from a robot controller 122. Robot controller 122 may include processor, memory, drivers, conditioning electronics and other circuitry to cause drive signals to be sent to the various motors, receive feedback from encoders, and coordinate with other system processing functions and possibly other controllers. As shown, robot controller 122 may, for example, receive input signals from beam sensors (e.g., first beam sensors 124A, 124B, 124C) to carry out improved end effector calibration adjustments, as will be explained more fully below.

Mounted at a first outboard end of the boom 112, at a first radial position offset and spaced from the central axis 114, is the first selective compliance assembly robot arm (SCARA) robot 116. Mounted at a second outboard end of the boom 112, opposite the first end, at a second radial position offset and spaced from the central axis 114, is the second selective compliance assembly robot arm (SCARA) robot 118. The motor housing 120 includes portions of drive assemblies configured to drive the boom 112, as well as to drive the first SCARA robot 116 and second SCARA robot 118. The motor housing 120, motors, drive components, moveable arms, first end effector 102, and second end effector 104 of the first and second SCARA robots 116, 118 make up the dual-bladed robot 100.

The first SCARA robot 116 includes first moveable arms (e.g., first upper arm 126, first forearm 128, and first wrist member 130) and the first end effector 102 coupled to one of the first moveable arms, such as to the first wrist member 130.

In the depicted embodiment, the first upper arm 126 may be rotated in the X-Y plane (FIG. 1A) relative to the boom 112 about a second axis 138 (FIG. 1D) offset and spaced from the central axis 114. In this embodiment, the first upper arm 126 may be independently driven by the second motor 121 and a first upper arm drive assembly. The second motor 121 may be a stepper motor, variable reluctance electric motor, or permanent magnet electric motor, for example. Other suitable types of motors may be used. Feedback of the rotational position of the second motor 121 may be provided by a second encoder 121E, which may be the same type of encoder as the first encoder 115E. The first upper arm drive assembly may comprise any suitable structure for driving the first upper arm 126.

For example, the first upper arm drive assembly may include a second shaft 123 coupled to the rotor of the second motor 121 on one end and a first upper arm drive member 125 (e.g., a cylindrical pulley) on the other end. The first upper arm driving member 125 may be connected to a first upper arm driven member 127 (e.g., another cylindrical pulley) by a first upper arm transmission element 129. The first upper arm transmission element 129 may be one or more belts, such as two discontinuous metal belts oppositely wrapped about the first upper arm driving member 125 and the first upper arm driven member 127, for example. First upper arm driven member 127 may be rigidly coupled to the first upper arm 126, such as by a pilot.

Coupled for rotation relative to the first upper arm 126 at a second position spaced from the second axis 138 is the first forearm 128. The first forearm 128 is rotatable in the X-Y plane relative to the first upper arm 126 about a third axis 140 at the second position.

Located on an outboard end of the first forearm 128 at a position spaced from the third axis 140 is the first wrist member 130. The first wrist member 130 is rotatable in the X-Y plane relative to the first forearm 128 about a fourth axis 142, which is coincident with the second axis 138 when in the retracted position shown in FIG. 1D. The length of the first upper arm 126 may be the same as the length of the first forearm 128.

Furthermore, the first wrist member 130 is adapted to couple to the first end effector 102 that is adapted to support and transport the substrate 101 during pick and place operations. The first end effector 102 may be of any suitable construction, and may be made of a ceramic material in some embodiments. The first end effector 102 may be coupled to the first wrist member 130 by any suitable means such as mechanical fastening, adhering, clamping, or the like. Optionally, the first wrist member 130 and first end effector 102 may be coupled to each other by being formed as one integral piece.

A forearm drive assembly may be at least partially included inside the first upper arm 126 and may be adapted to rotate the first forearm 128 relative to the first upper arm 126. The forearm drive assembly may include a first forearm driving member 131 and a first forearm driven member 133. The first forearm driving member 131 may be a cylindrical pulley rigidly coupled to the first upper arm 126. The first forearm driven member 133 may be a cylindrical pulley rigidly coupled to the first forearm 128.

A first wrist member drive assembly may be at least partially included inside of the first forearm 128 and the first upper arm 126 and is adapted to kinematically move the first wrist member 130 in pure translation in extension and retraction as indicated by directional arrow 143 (FIG. 1A), upon rotation of the first upper arm 126. Pure translation may be achieved by using a 2:1 pulley ratio in the first upper arm 126 and a 1:2 pulley ratio in the first forearm 128

The first wrist member drive assembly may include a first wrist member driving member 135 (e.g., a cylindrical pulley), a first wrist member driven member 137 (e.g., another cylindrical pulley) connected by a first wrist member transmission element 139. The first wrist member transmission element 139 may be one or more belts as described above, for example.

Mounted at a second outboard end of the boom 112, opposite the first end, and at a radial position offset and spaced from the central axis 114, is the second selective compliance assembly robot arm (SCARA) robot 118 of the dual-bladed robot 100. The second SCARA robot 118 includes second moveable arms (e.g., second upper arm 132, second forearm 134, and second wrist member 136) and the second end effector 104 coupled to one of the second moveable arms, such as to the second wrist member 136.

In the depicted embodiment, the second upper arm 132 may be rotated in the X-Y plane relative to the boom 112 about a fifth axis 144 offset and spaced from the central axis 114. In this embodiment, the second upper arm 132 may be independently driven by a third motor 141 and a second upper arm drive assembly (FIG. 1E). The third motor 141 may be a stepper motor, variable reluctance electric motor, or permanent magnet electric motor, for example. Other suitable types of motors may be used. A third encoder 141E may be included to provide feedback signals to robot controller 122. The second upper arm drive assembly may comprise any suitable structure for driving the second upper arm 132. For example, the drive system may be similar to the drive system for the first upper arm 126, and include a third shaft 147 coupled to the third motor 141 and a second upper arm driving member 145 (e.g., a cylindrical pulley) as shown.

Coupled to the second upper arm 132 at a second position spaced from the fifth axis 144 is a second forearm 134. The second forearm 134 is rotatable in the X-Y plane relative to the second upper arm 132 about a sixth axis 146 at the second position.

Located on an outboard end of the second forearm 134 at a position spaced from the sixth axis 146 is the second wrist member 136. The second wrist member 136 is rotatable in the X-Y plane relative to the second forearm 134 about a seventh axis 148, which is coincident with the fifth axis 144 when in the retracted orientation shown in FIG. 1D.

Furthermore, the second wrist member 136 is adapted to couple to the second end effector 104 that is adapted to support and transport the substrate 101 during pick and place operations. The second end effector 104 may be of any suitable construction, and may be made of a ceramic material in some embodiments. The second end effector 104 may be coupled to the second wrist member 136 by any suitable means such as mechanical fastening, adhering, clamping, or the like. Optionally, the second wrist member 136 and second end effector 104 may be coupled to each other by being formed as one integral piece.

A second forearm drive assembly may be at least partially provided in the second upper arm 132 and a second wrist drive assembly may be at least partially included within the second forearm 134 and as is shown in FIG. 1E. The second wrist drive assembly is adapted to move the second wrist member 136 in pure translation in extension and retraction as indicated by second directional arrow 149 (FIG. 1A), upon rotation of the second upper arm 132. Pure translation may be achieved by using a 1:2 pulley ratio in the second upper arm 132 and a 2:1 pulley ratio in the second forearm 134.

Figure 1B:
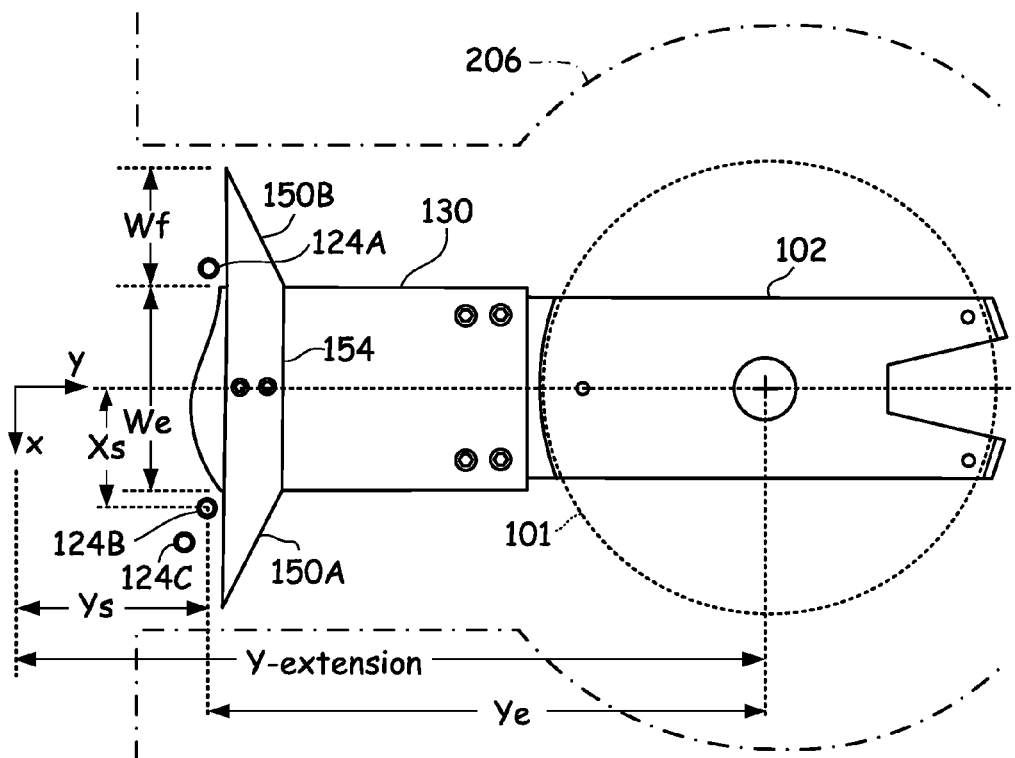
FIG. 1B illustrates a partial top plan view of a blade (wrist and coupled end effector) of a SCARA robot including calibration-assisting flags in relationship to beam sensors according to one or more embodiments.
Figure 1C:
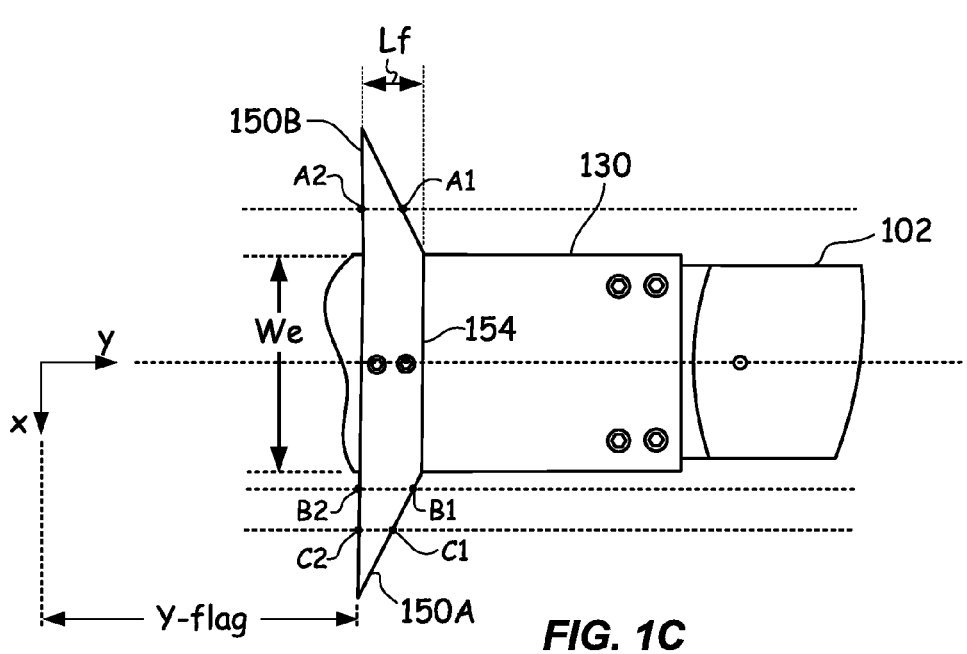
FIG. 1C illustrates a partial top plan view of a blade of a SCARA robot including calibration-assisting flags and showing beam sensor transition locations according to one or more embodiments.
Figure 1D:
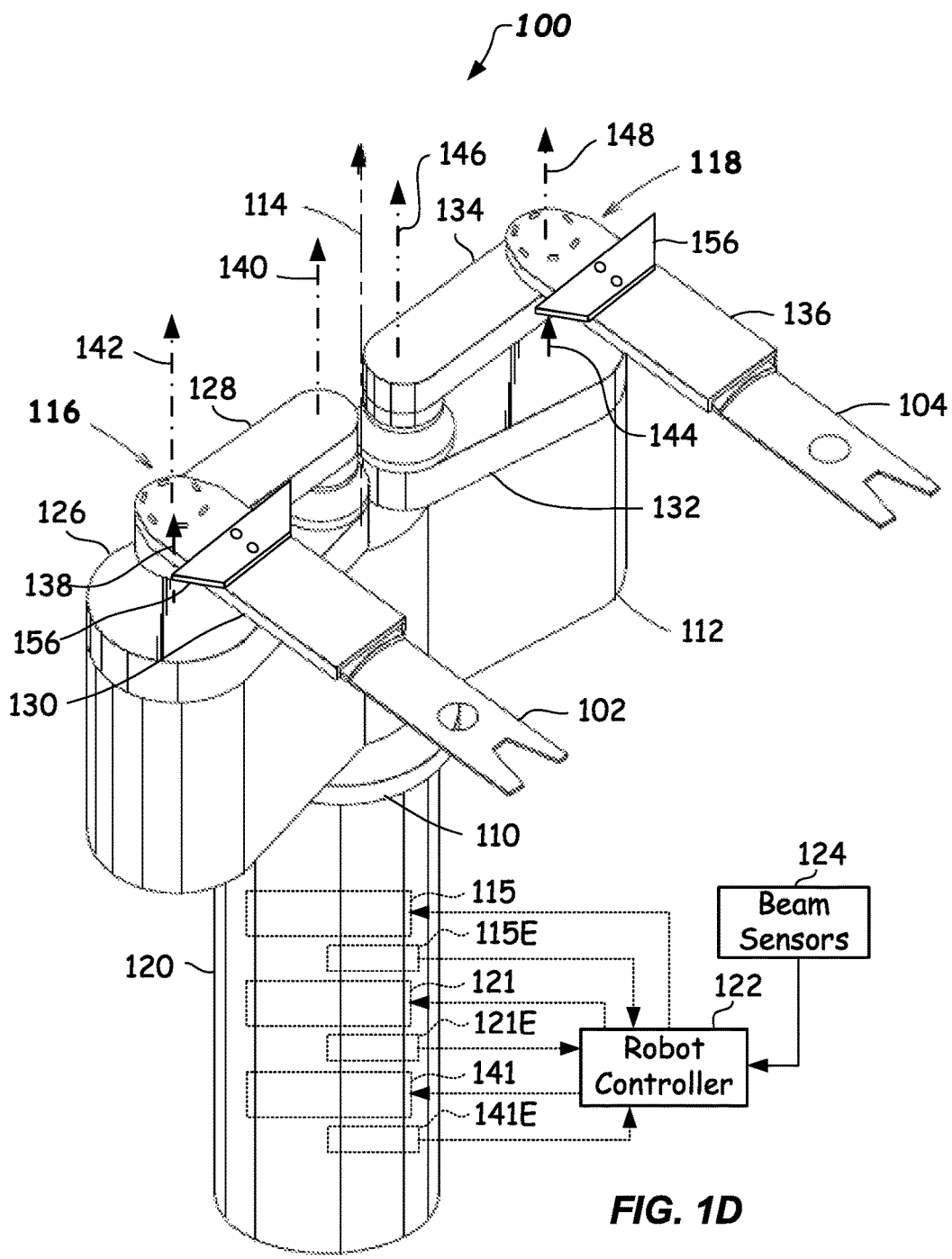
FIG. 1D illustrates an isometric view of a dual-bladed robot including calibration-assisting flags according to one or more embodiments.
Figure 1E:
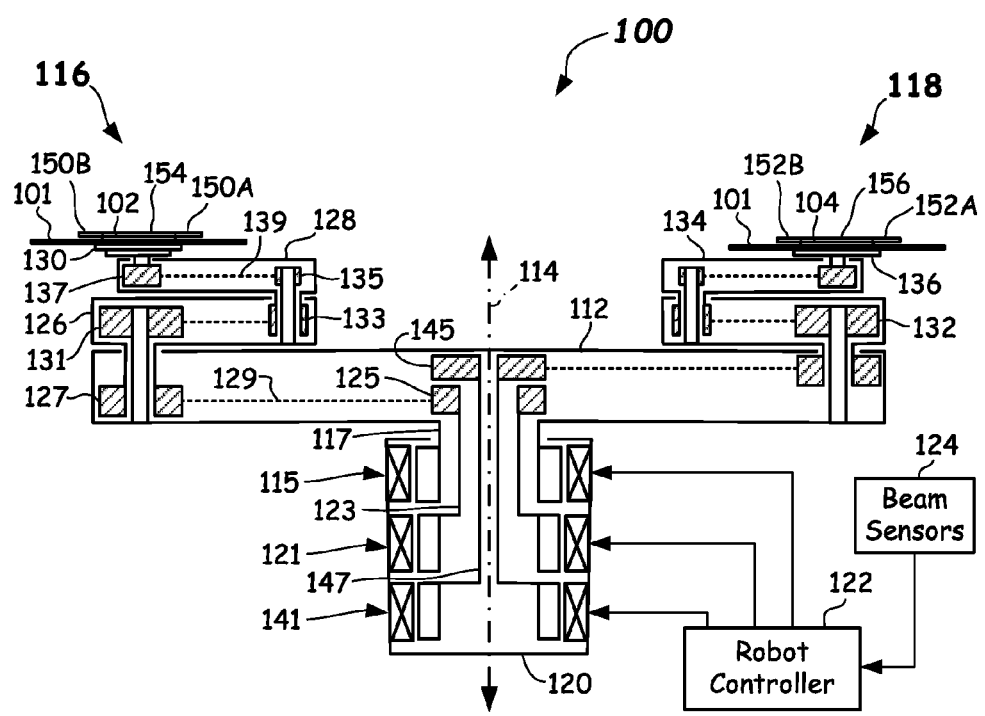
FIG. 1E illustrates a schematic side view of the drive assemblies of a dual-bladed SCARA robot according to one or more embodiments.
Figure 2A:
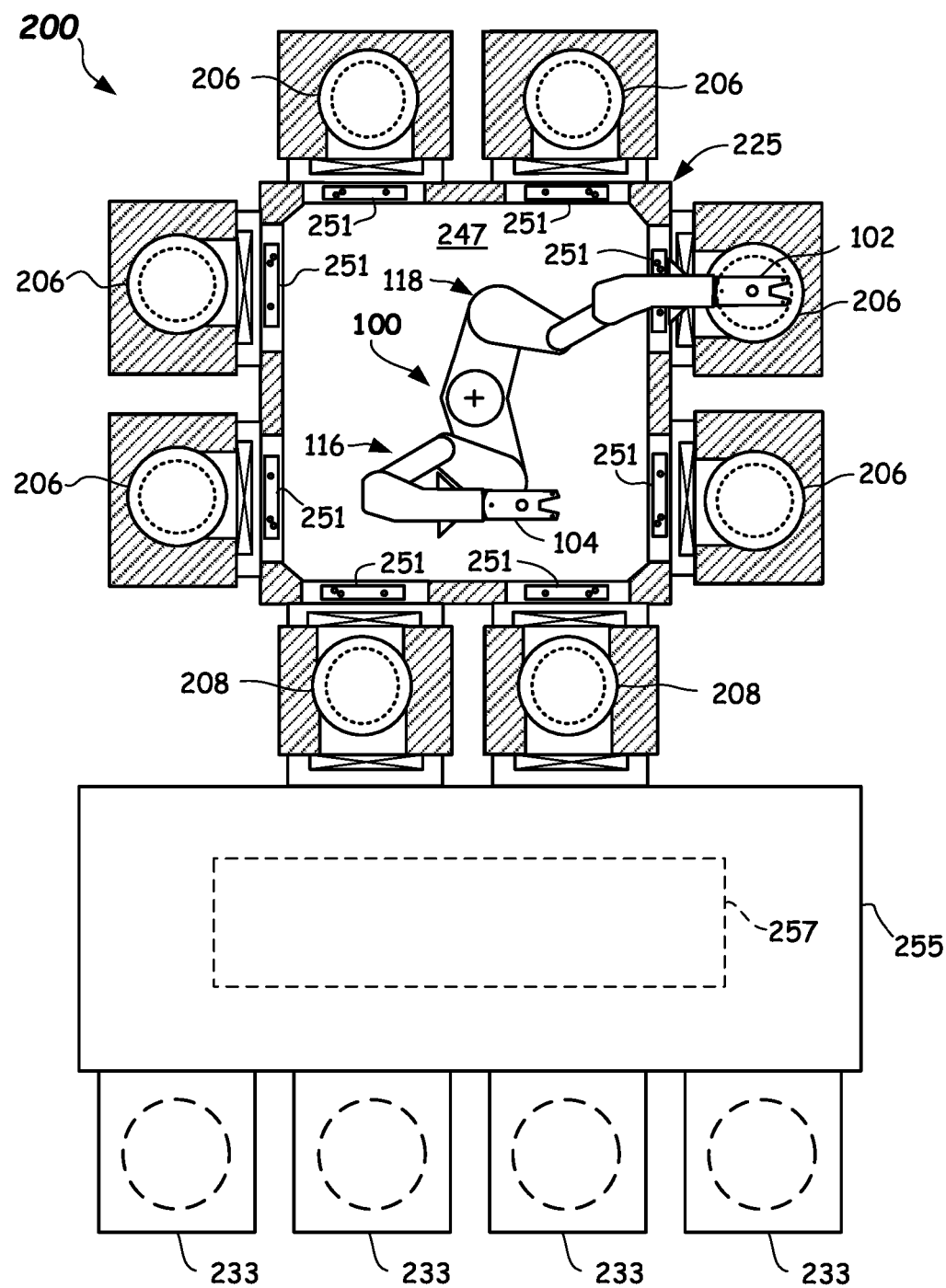
FIG. 2A illustrates a schematic top view of a dual-bladed SCARA robot including calibration-assisting flags and showing a first configuration with a first end effector extended into a chamber (e.g., process chamber) according to one or more embodiments.
Figure 2B:
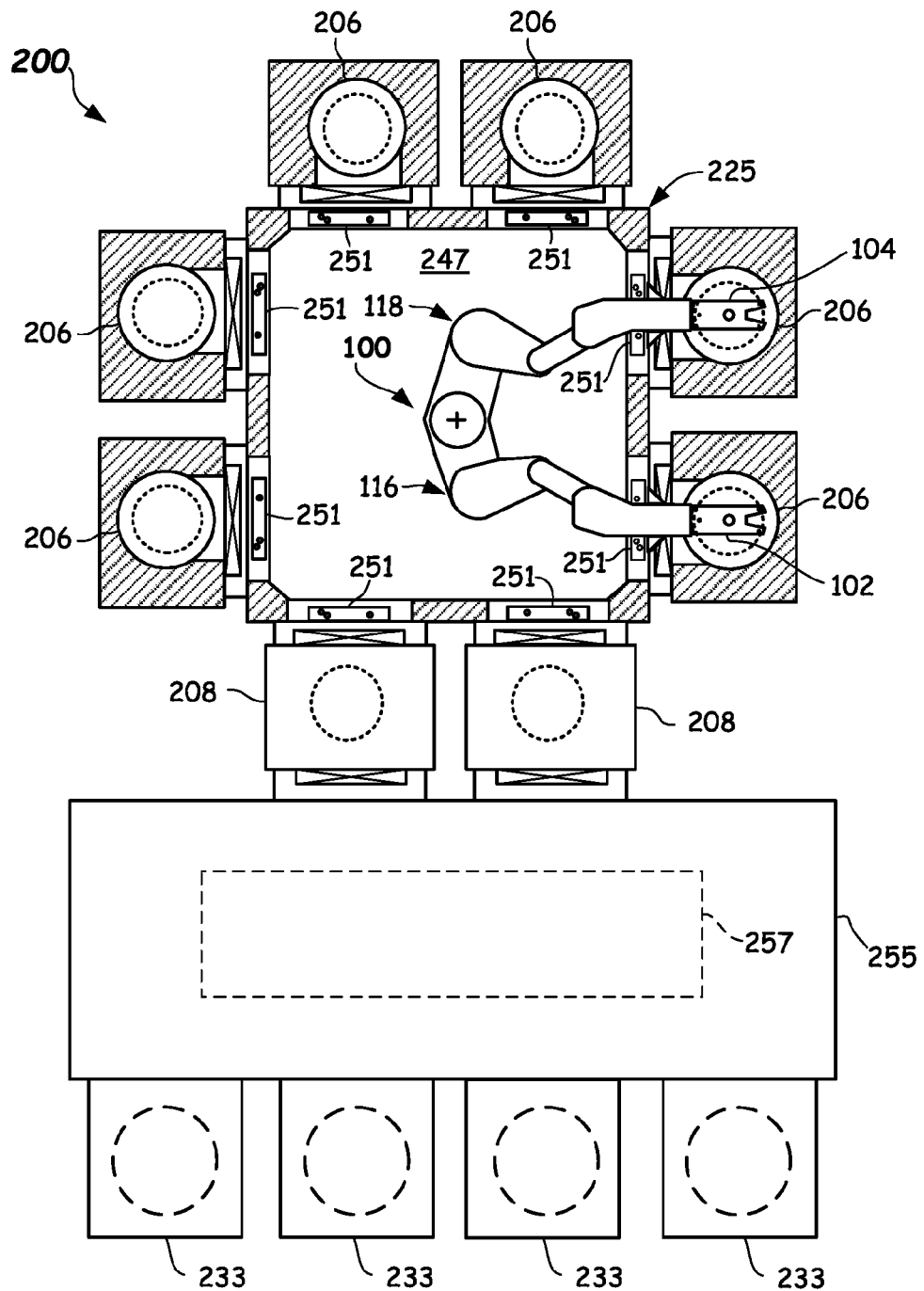
FIG. 2B illustrates a top schematic view of a dual-bladed SCARA robot including calibration-assisting flags and showing a second configuration with a first end effector and a second end effector extended into chambers (e.g., twinned process chambers) simultaneously according to one or more embodiments.
Figure 2C:
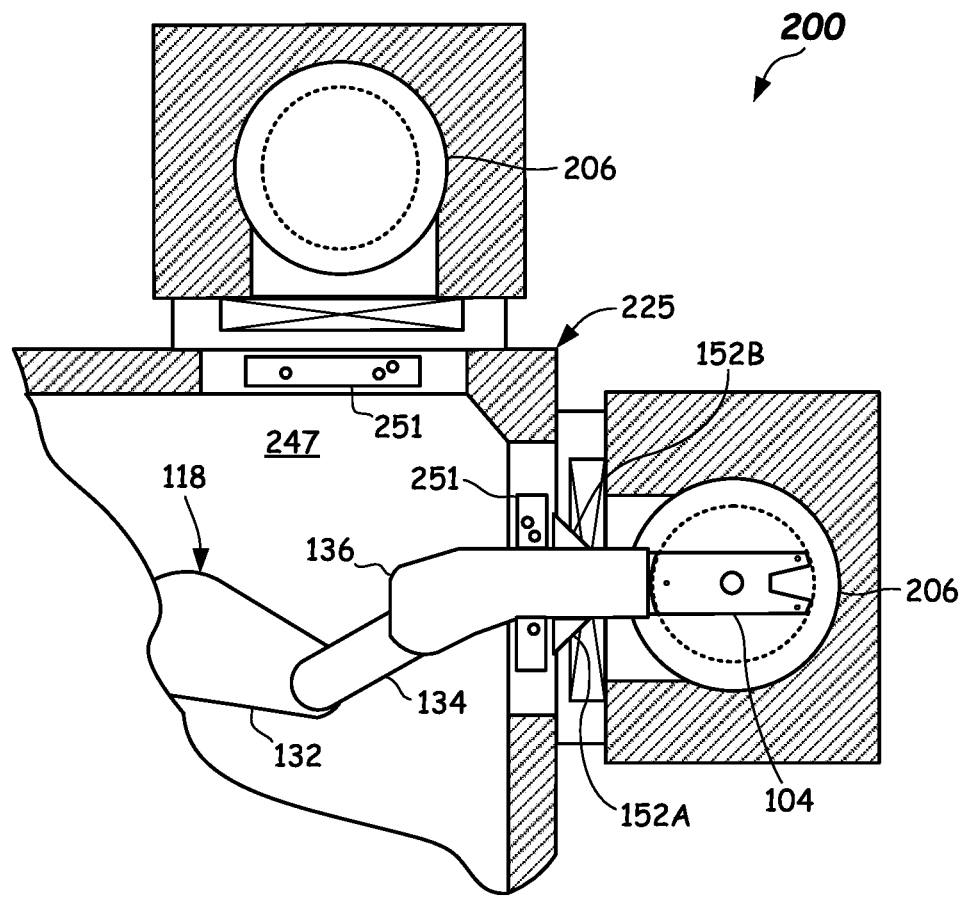
FIG. 2C illustrates an enlarged top partial view of one portion of a dual-bladed SCARA robot including calibration-assisting flags and showing the flags on a first end effector extended onto a chamber to a location beyond a beam sensor assembly according to one or more embodiments.

As shown in FIGS. 1A-1E, one or more flags, such as first flags 150A, 150B and second flags 152A, 152B may be provided. In the depicted embodiment, the first flags 150A, 150B may be mounted on one of the first moveable arms and second flags 152A, 152B may be mounted on one of the second moveable arms, respectively. In particular, the first flags 150A, 150B may be mounted on the first wrist member 130. The second flags 152A, 152B may be mounted on the second wrist member 136. However, in some embodiments, the first flags 150A, 150B and second flags 152A, 152B may be mounted on the first end effector 102 and the second end effector 104, as shown dotted (FIG. 1A).

FIGS. 1B and 1C illustrate the first flags 150A, 150B extending from the sides of the first wrist member 130 and will be described in detail herein. The function and structure of the second flags 152A, 152B will be identical. The first flags 150A, 150B may be triangular in shape and may extend beyond a width We of the first wrist member 130. The first flags 150A, 150B and second flags 152A, 152B may be part of plate members 154, 156, which may be coupled to the first wrist member 130 and second wrist member 136, respectively, such as to top surfaces thereof. Coupling may be by fasteners. Optionally one or more flags 150A, 150B, 152A, 152B may be integral with first and second wrist members 130, 136. As will be described, the first and second flags 150A, 150B, 152A, 152B may be used to accurately calibrate a location of centers of the first end effector 102 and the second end effector 104 when extended into a chamber.

Now referring more specifically to FIGS. 1B-1C, a robot calibration system will be described in greater detail. The robot calibration system may be beneficial for determining a positional correction of a robot as compared to a position determined by a previous calibration, or may be used for the calibration itself. In one embodiment, the robot calibration system may include a dual-bladed robot 100, including the first end effector 102 and the second end effector 104. First flags 150A, 150B may be disposed on either the first end effector 102 or one of the first moveable arms. Second flags 152A, 152B (just first flags 150A, 150B are shown in FIGS. 1B-1C) may be disposed on either the second end effector 104 or one of the second moveable arms. The system will be described for determining a position adjustment of the first end effector 102, but may apply equally to determining a position adjustment of the second end effector 104.

The robot controller 122 may be electrically coupled to the robot (e.g., dual-bladed robot 100) and may be configured to move the robot (e.g., dual-bladed robot 100) into a first robot configuration. In the first robot configuration, the first end effector 102 is extended fully, and this extension of the first end effector 102 is shown in FIG. 1B. In the case of a dual-bladed robot 100, the second end effector 104 is retracted (as shown in FIG. 2A).

One or more beam sensors (e.g., first beam sensors 124A, 124B, 124C) may be provided at a position that is proximate to a location of the process chamber 206, such that one or more flags (e.g., first flags 150A, 150B) may pass through them. The first beam sensors 124A, 124B, 124C may be any suitable sensor type, such as a sensor including a sending member and a receiving member. The sending member may send a beam of light, such as from a laser or light emitting diode, and the receiver may be any suitable light detector. When a sensor beam is broken, a signal may be emitted therefore enabling identification of a transition.

In one or more embodiments, first flags 150A, 150B are positioned such that the first flags 150A, 150B just pass by the first beam sensors 124A-124C as the center of the first end effector 102 is received at a center of the chamber (e.g., center of the process chamber 206, for example). The back side of the first flags 150A, 150B may pass by the first beam sensors 124A, 124B by about 0.0 mm to 12.5 mm, for example.

Second beam sensors (not shown) may be provided proximate to a second process location, such that the second flags 152A, 152B may pass through the second beam sensors in the same manner as described for the first flags 150A, 150B. The first beam sensors 124A-124C may be provided in a beam sensor assembly 251 as shown in FIG. 2A-2C in some embodiments, which may be mounted in or near an opening (e.g., a slit valve opening) or channel passing between the transfer chamber 247 and the process chamber 206 or load lock chamber 208. Beam sensor assembly 251 may space the physical sensor away from the slit valve opening and may be used for linear center finding of substrates 101. Beam sensor assembles are described in U.S. Pat. No. 8,064,070 to Schauer.

As the first wrist member 130 including plate member 154 and first flags 150A, 150B, first encounters the first beam sensors 124A, 124B, 124C, the beams thereof are broken at first broken transition locations A1, B1, C1. The encoder readings from encoders at each of these first broken transition locations A1, B1, C1 may be recorded. Then the plate member 154 passes by the first beam sensors 124A, 124B, 124C and the beams are unbroken at the unbroken transition locations A2, B2, C2. These broken transition locations A1, B1, C1 and unbroken transition locations A2, B2, C2 are recorded in memory of the robot controller 122 (locations A1-C2 shown in FIG. 1C).

FIG. 2C depicts an enlarged view of one end effector (e.g., second end effector 104) extending into a chamber (e.g., process chamber 206), wherein the flags (e.g., second flags 152A, 152B) have passed through first the broken transition locations A1, B1, and C1, and the unbroken transition locations A2, B2, and C2, for the second beam sensors.

In some embodiments, the first beam sensors 124A-124C are used in the prior art for finding a center (referred to herein as linear center-finding or LCF) of the substrate 101 as the substrate 101 passes through a slit valve opening. Embodiments of the present disclosure may use these first beam sensors 124A-124C, for example, given that they are already present in the system.

When performing linear center-finding according to the prior art, the first end effector 102 is started initially in the transfer chamber 247 outside of the process chamber 206, and is then passed by the first beam sensors 124A-124C, for example, to determine a center of the substrate 101. The center may be determined using information from each of the first beam sensors 124A-124C, and correlated encoder readings. Adjustments in the X and/or Y directions may be carried out by the robot 100 based upon the determined center of the substrate 101.

As shown in FIG. 1B, this LCF calibration information may determine several dimensions, including values for Xs and Ys along each of the x-axis and y-axis, i.e., a position of the first beam sensor 124B as well as sensor hysteresis, i.e. a time delay from breaking the first beam sensor 124B a signal input of the robot controller 122.

From this determined center of the substrate 101, an LCF position correction is determined for the first end effector 102, and the first end effector 102 is adjusted so that the center of the substrate 101 is estimated to be aligned with the center of the process chamber 206.

However, this LCF position adjustment assumes that the exact position of the first end effector 102 is known based on an earlier calibration. Changes in the system, though, due to wear, droop when just the first end effector 102 is inserted, and other factors may alter the actual position of the end effector. Because of this, when just the existing calibration is used, the center of the first end effector 102 may not be concurrent with the center of the process chamber 206 when the first end effector 102 is fully extended.

Thus, in one or more embodiments, the present disclosure takes into account changes that may occur in actual location of a center of the first end effector 102 in either the x or y directions after the initial LCF calibration is performed. An additional position correction may be generated and used as determined by embodiments of the disclosure described below.

In order to determine the additional position correction to account for the possible positional discrepancy, broken and unbroken transition information based on engagement of the first flags 150A, 150B with the first beam sensors 124A-124C may be used.

Due to these broken and unbroken transitions, the following measured positions may be recorded:

$P_{A1}$=Robot end effector expected position during a single blade extension for sensor transition A1, $P_{A1x}$=Components x of $P_{A1}$, $P_{A1y}$=Components y of $P_{A1}$ $P_{A2}$=Robot end effector expected position during a single blade extension for sensor transition A2, $P_{A2x}$=Components x of $P_{A2}$, $P_{A2y}$=Components y of $P_{A2}$, $P_{B1}$=Robot end effector expected position during a single blade extension for sensor transition B1, $P_{B1x}$=Components x of $P_{B1}$, $P_{B1y}$=Components y of $P_{B1}$, $P_{B2}$=Robot end effector expected position during a single blade extension for sensor transition B2, $P_{B2x}$=Components x of $P_{B2}$, $P_{B2y}$=Components y of $P_{B2}$, $P_{C1}$=Robot end effector expected position during a single blade extension for sensor transition C1, $P_{C1x}$=Components x of $P_{C1}$, $P_{C1y}$=Components y of $P_{C1}$, $P_{C2}$=Robot end effector expected position during a single blade extension for sensor transition C2, $P_{C2x}$=Components x of $P_{C2}$, and $P_{C2y}$=Components y of $P_{C2}$.

The above expected positions may be used in combination with these positions previously recorded during the initial LCF calibration of the first end effector 102:

$Q_{A1}$=Robot end effector recorded position during an initial calibration for sensor transition A1, $Q_{A1x}$=Components x of $Q_{A1}$, and $Q_{A1y}$=Components y of $Q_{A1}$.

$S_{A2}$=Robot end effector recorded position during an initial calibration for sensor transition A2, $Q_{A2x}$=Components x of $Q_{A2}$, and $Q_{A2y}$=Components y of $Q_{A2}$.

$Q_{B1}$=Robot end effector recorded position during an initial calibration for sensor transition B1, $Q_{B1x}$=Components x of $Q_{B1}$, and $Q_{B1y}$=Components y of $Q_{B1}$.

$Q_{B2}$=Robot end effector recorded position during an initial calibration for sensor transition B2, $Q_{B2x}$=Components x of $Q_{B2}$, and $Q_{B2y}$=Components y of $Q_{B2}$.

$Q_{C1}$=Robot end effector recorded position during an initial calibration for sensor transition C1, $Q_{C1x}$=Components x of $Q_{C1}$, and $Q_{C1y}$=Components y of $Q_{C1}$.

$Q_{C2}$=Robot end effector recorded position during an initial calibration for sensor transition C2, $Q_{C2x}$=Components x of $Q_{C2}$, and $Q_{C2y}$=Components y of $S_{C2}$.

An estimate for the position correction E in both the x and y directions ($E_x$, $E_y$) may be determined using the following equations:

$$E_y = (1/3)(P_{A2y} + P_{B2y} + P_{C2y} - Q_{A2y} - Q_{B2y} - Q_{C2y})$$

$$E_x = (k_a/3)(|P_{A2} - P_{A1}| - |Q_{A2} - Q_{A1}|) - (k_b/3)(|P_{B2} - P_{B1}| - |Q_{B2} - Q_{B1}|) + (k_c/3)(|P_{C2} - P_{C1}| - |Q_{C2} - Q_{C1}|) - (1/6)(P_{A1x} + P_{A2x} - Q_{A1x} - Q_{A2x} + P_{B1x} + P_{B2x} - Q_{B1x} - Q_{B2x} + P_{C1x} + P_{C2x} - Q_{C1x} - Q_{C2x})$$

Wherein:

$k_a$ = Wf/Lf, or the slope of flag at point A,
$k_b$ = −Wf/Lf, or the slope of flag at point B,
$k_c$ = −Wf/Lf, or the slope of flag at point C, and
|p| = the norm of a vector.

Additionally, the dual-bladed robot 100 may be moved into a second robot configuration, i.e. with both the first end effector 102 and the second end effector 104 extended (as shown in FIG. 2B), for example.

An LCF position correction is again determined in the same manner as previously described, for both the first end effector 102 and the second end effector 104. The end effectors 102, 104 are adjusted then so that the center of each of the substrates 101 (which are mounted on the ends of the end effectors 102, 104) is estimated to be aligned with the center of each of the process chambers 206 into which the end effectors 102, 104 are to extend. Each end effector 102, 104 is extended one at a time to pass through the first beam sensors 124A-124C and each LCF position correction is recorded individually.

However, this LCF position adjustment again assumes that the exact position of each of the end effectors 102, 104 is known based on an earlier calibration. Changes in the system, though, due to wear, droop, and other factors may alter the actual position of the end effectors. This additional movement may be of a greater value for the second configuration of the dual-bladed robot 100 than for the first configuration, due to additional weight caused by extending both end effectors 102, 104 at once, for example, or other factors.

Because of this, when just the existing calibration is used, the centers of both the first end effector 102 and the second end effector 104 may not be concurrent with the centers of each of the process chambers 206, when the end effectors 102, 104 are fully extended in unison. Thus, in one or more embodiments, the present disclosure takes into account changes that may occur in the actual location of the first end effector 102 and the second end effector 104 in either the x or y directions after the initial LCF calibration is performed. An additional position correction may be generated and used as determined by embodiments of the disclosure described below.

Similar to the process described for a single end effector, a position correction may again be calculated, now to account for additional movement of the end effectors 102, 104 that may be due to extending both of the end effectors 102, 104 at once, as opposed to extending just the first end effector 102. An additional position correction may be calculated for each of the first end effector 102 and the second end effector 104.

In order to determine the additional position corrections, broken and unbroken transition information based on engagement of the first flags 150A, 150B and the second flags 152A, 152B with the first beam sensors 124A-124C and second beam sensors (now shown) may be used.

Due to these broken and unbroken transitions, the following measured positions may be recorded for each of the end effectors 102, 104:

$D_{A1}$ = Robot end effector expected position during a dual blade extension for sensor transition A1, $P_{A1x}$ = Components x of $P_{A1}$, $P_{A1y}$ = Components y of $P_{A1}$.

$P_{A2}$ = Robot end effector expected position during a dual blade extension for sensor transition A2, $P_{A2x}$ = Components x of $P_{A2}$, $P_{A2y}$ = Components y of $P_{A2}$.

$P_{B1}$ = Robot end effector expected position during a dual blade extension for sensor transition B1, $P_{B1x}$ = Components x of $P_{B1}$, $P_{B1y}$ = Components y of $P_{B1}$.

$P_{B2}$ = Robot end effector expected position during a dual blade extension for sensor transition B2, $P_{B2x}$ = Components x of $P_{B2}$, $P_{B2y}$ = Components y of $P_{B2}$.

$P_{C1}$ = Robot end effector expected position during a dual blade extension for sensor transition C1, $P_{C1x}$ = Components x of $P_{C1}$, $P_{C1y}$ = Components y of $P_{C1}$.

$P_{C2}$ = Robot end effector expected position during a single blade extension for sensor transition C2, $P_{C2x}$ = Components x of $P_{C2}$, $P_{C2y}$ = Components y of $P_{C2}$.

The above expected positions are used in combination with the positions $Q_{A1}$ through $Q_{C2}$ (definitions listed above in paragraphs 00067 through 00072), which were previously recorded during the initial LCF calibration performed separately on each of the first end effector 102 and the second end effector 104.

Using the above parameters, an estimate for the difference in placement of the extended position with dual extension vs. single extension, i.e., the position correction E in both the x and y directions ($E_x$, $E_y$), for each of the end effectors 102, 104 may be determined using the following equations:

$$E_y = (1/3)(P_{A2y} + P_{B2y} + P_{C2y} - Q_{A2y} - Q_{B2y} - Q_{C2y})$$

$$E_x = (k_a/3)(|P_{A2} - P_{A1}| - |Q_{A2} - Q_{A1}|) - (k_b/3)(|P_{B2} - P_{B1}| - |Q_{B2} - Q_{B1}|) + (k_c/3)(|P_{C2} - P_{C1}| - |Q_{C2} - Q_{C1}|) - (1/6)(P_{A1x} + P_{A2x} - Q_{A1x} - Q_{A2x} + P_{B1x} + P_{B2x} - Q_{B1x} - Q_{B2x} + P_{C1x} + P_{C2x} - Q_{C1x} - Q_{C2x})$$

Wherein:

$k_a$ = Wf/Lf, or the slope of flag at point A,
$k_b$ = −Wf/Lf, or the slope of flag at point B,
$k_c$ = −Wf/Lf, or the slope of flag at point C, and
|p| = the norm of a vector.

All of the above may also be carried out using a robot, which may other than a dual-bladed robot 100. The robot may including moveable arms and having a singular end effector, such as first end effector 102, attached to one of the moveable arms, and a singular flag, such as flag 150A, or multiple flags, which may pass through a beam sensor, such as first beam sensor 124A, or beam sensors 124A, 124B.

After the additional position correction is determined, this position correction may be used to move one or both of the first end effector 102 and the second end effector 104 by an additional amount as compared to the initial LCF calibration, so that the centers of one or both of the end effectors 102, 104 may be positioned to be aligned with the true center of the chamber (e.g., one or more process chambers 206) into which the one or more end effectors 102, 104 may be extended.

To understand the calibration operation, the structure of the electronic device processing system 200 in which the dual-bladed robot 100 operates will be described with reference to FIGS. 2A-2C. The electronic device processing system 200 includes a mainframe housing 225 including a chamber 247 (e.g., a transfer chamber). A dual-bladed robot 100 may be at least partially disposed within the chamber 247, wherein the dual-bladed robot 100 may include first moveable arms of the first SCARA robot 116 and the first end effector 102, and second moveable arms the second SCARA robot 118 and the second end effector 104. First end effector 102 and second end effector 104 may be independently moveable in translation into and out of the process chambers 206 and load lock chambers 208.

First flags 150A, 150B may be disposed on either the first end effector 102 or one of the first moveable arms. Second flags 152A, 152B may be disposed on either the second end effector 104 or one of the second moveable arms. As shown, a first process chamber of the process chambers 206 may be adapted to be serviced by the first end effector 102 and a second process chamber of the process chambers 206 may be adapted to be serviced by the second end effector 104. Service as used herein means that substrates 101 may be picked from or placed in the process chambers 206.

Shown mounted in an entrance into the process chambers 206 and the load lock chambers 208 are beam sensor assemblies 251. Beam sensor assemblies 251 may be a collection of the first beam sensors 124A, 124B, 124C.

As shown in FIG. 2A, the electronic device processing system 200 may include the dual-bladed robot 100 in a first robot configuration, wherein just the first end effector 102 is extended and the second end effector 104 is retracted.

As shown in FIG. 2B, the electronic device processing system 200 may alternatively include the dual-bladed robot 100 in a second robot configuration, wherein both the first end effector 102 and the second end effector 104 are extended.

In another embodiment, the dual-bladed robot 100 may take on a third robot configuration (FIG. 2C), wherein just the second end effector 104 is extended and the first end effector 102 is retracted, and wherein the third robot configuration is treated in the same manner as the first robot configuration.

In the depicted embodiments of FIGS. 2A-2B, the dual-bladed robot 100 is shown located and housed in the chamber 247 (e.g., a transfer chamber). However, it should be recognized that the dual-bladed robot 100 and method described herein may advantageously be used in other areas of electronic device manufacturing, such as in a factory interface 255. The factory interface 255 may be coupled to one or more front opening unified pods (FOUPs) 233, wherein the dual-bladed robot 100 may serve as a robot apparatus 257 and be configured to transport substrates 101 between the front opening unified pods (FOUPs) 233 docked at load ports of the factory interface 255 and the load lock chambers 208 of the processing system, for example. The dual-bladed robot 100 is also capable of other transporting uses.

Figure 3:
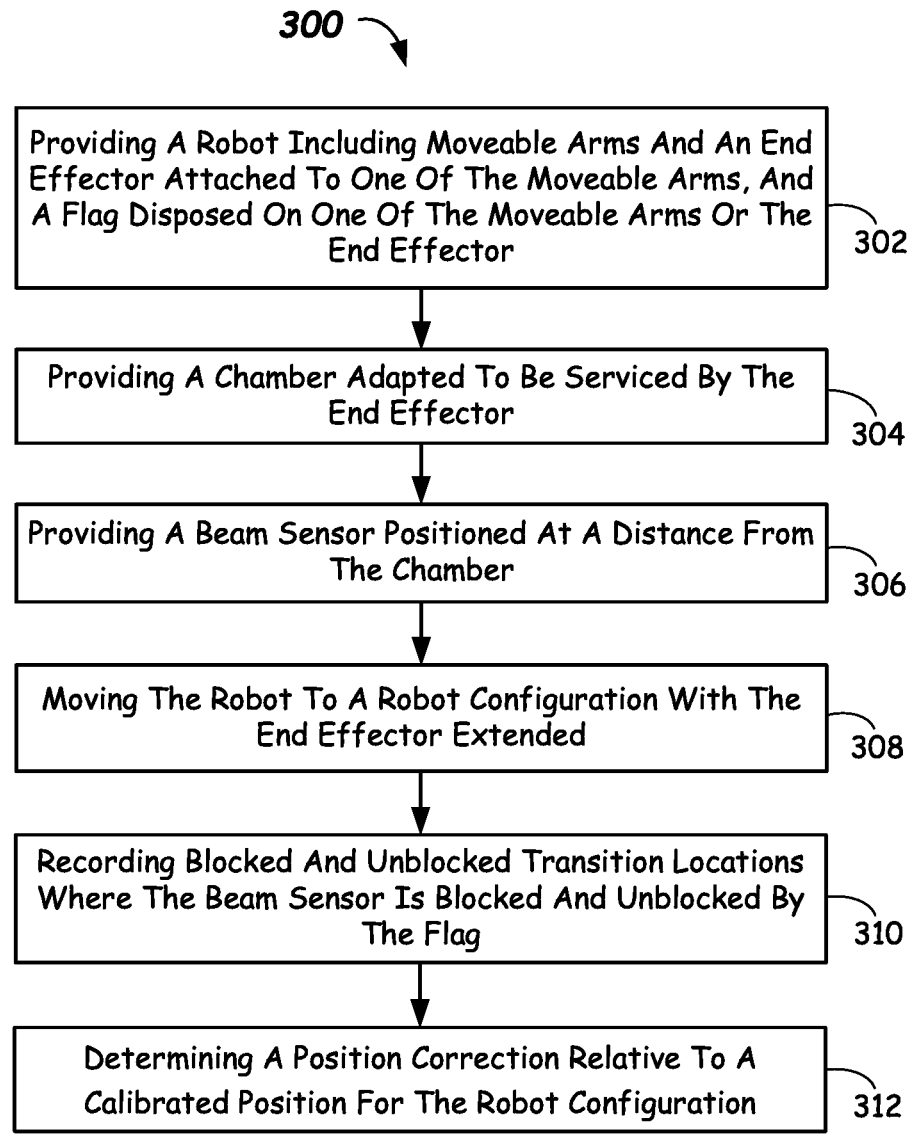
FIG. 3 is a flowchart depicting a method of correcting misalignment in a robot according to one or more embodiments.

A method 300 of correcting misalignment in a robot will now be described with reference to FIG. 3. The misalignment correction is carried out to determine an amount of correction, and then the position correction may be applied.

In 302, the method 300 includes providing a robot including moveable arms and an end effector (e.g., a first end effector 102) attached to one of the moveable arms, and a flag (e.g., first flag 150A) disposed on one of the moveable arms or the end effector.

The method 300 further includes, in 304, providing a chamber (e.g., process chamber 206) adapted to be serviced by the end effector (e.g., a first end effector 102), and, in 306, providing a beam sensor (i.e. first beam sensor 124A) positioned at a distance from the chamber.

In 308, the method 300 comprises moving the robot to a robot configuration with the end effector extended, in 310 recording blocked and unblocked transition locations where the beam sensor is blocked and unblocked by the flag, and lastly, in 312, determining a position correction (e.g., position correction $E_y$, $E_x$) relative to a calibrated position for the robot configuration.

Figure 4:
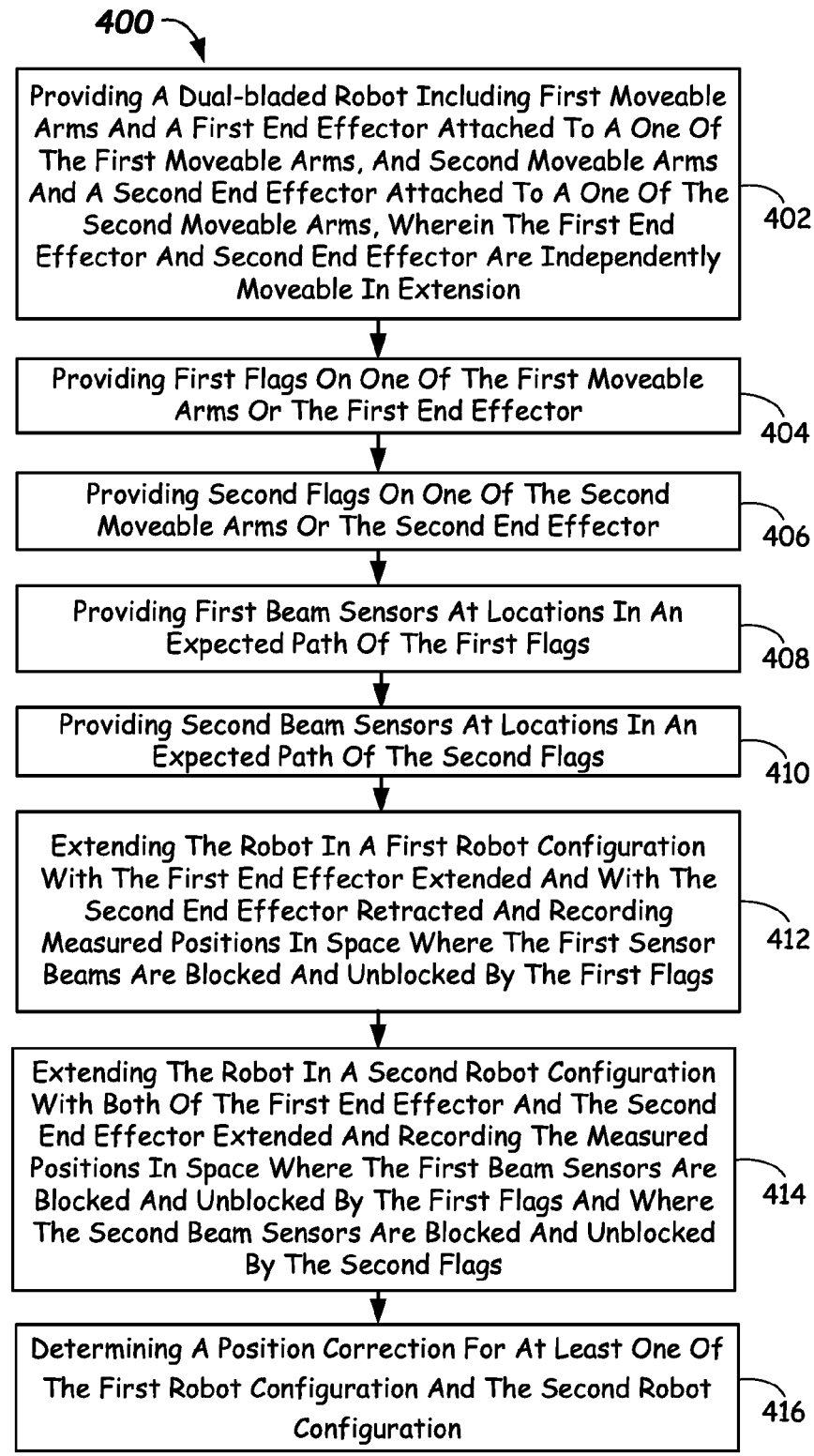
FIG. 4 is a flowchart depicting a method of correcting misalignment in a dual-bladed robot according to one or more embodiments.

A method 400 of correcting misalignment in a dual-bladed robot (e.g., dual-bladed robot 100) will now be described with reference to FIG. 4. The misalignment correction is carried out to determine an amount of correction to properly center the end effector, and then a position correction may be applied.

The method 400 includes, in 402, providing the dual-bladed robot including first moveable arms and a first end effector (e.g., first end effector 102) attached to one of the first moveable arms, and second moveable arms and a second end effector (e.g., second end effector 104) attached to one of the second moveable arms, wherein the first end effector and second end effector are independently moveable in extension.

Further, in 404, the method 400 includes providing first flags (e.g., first flags 150A, 150B) on one of the first moveable arms or the first end effector, and, in 406, providing second flags (e.g., second flags 152A, 152B) on one of the second moveable arms or the second end effector.

In 408, the method 400 comprises providing first beam sensors (e.g., first beam sensors 124A, 124B, 124C) at locations in an expected path of the first flags, and, in 410, providing second beam sensors (not shown) at locations in an expected path of the second flags. Two or more beam sensors may be used.

In 412, the method 400 includes extending the robot in a first robot configuration (e.g., first robot configuration as shown in FIG. 2A) with the first end effector extended and with the second end effector retracted and recording measured positions in space where the first beam sensors are blocked and unblocked by the first flags, and additionally, in 414, extending the robot in a second robot configuration (e.g., second robot configuration as shown in FIG. 2B) with both of the first end effector and the second end effector extended and recording the measured positions in space where the first beam sensors are blocked and unblocked by the first flags and where the second beam sensors are blocked and unblocked by the second flags.

Lastly, in 416, the method 400 includes determining a position correction for at least one of the first robot configuration and the second robot configuration.

The foregoing description discloses example embodiments. Modifications of the above-disclosed methods and apparatus which fall within the scope of the disclosure will be readily apparent to those of ordinary skill in the art. Accordingly, while the present disclosure discloses example embodiments thereof, it should be understood that other embodiments may fall within the scope of the disclosure, as defined by the appended claims.

What is claimed is:

1. A method of correcting misalignment in a dual-bladed robot, comprising:
providing a dual-bladed robot including first moveable arms and a first end effector attached to a one of the first moveable arms, and second moveable arms and a second end effector attached to a one of the second moveable arms, wherein the first end effector and the second end effector are independently moveable in extension;
providing a controller coupled to the dual-bladed robot and operatively configured to control movement and record positions of each the first end effector and the second end effector;

providing first flags on one of the first moveable arms or the first end effector;

providing second flags on one of the second moveable arms or the second end effector;

providing first beam sensors at locations in an expected path of the first flags;

providing second beam sensors at locations in an expected path of the second flags;

extending the dual-bladed robot in a first robot configuration with the first end effector extended and with the second end effector retracted and recording measured positions in space where the first beam sensors are blocked and unblocked by the first flags;

extending the dual-bladed robot in a second robot configuration with both of the first end effector and the second end effector extended and recording the measured positions in space where the first beam sensors are blocked and unblocked by the first flags and where the second beam sensors are blocked and unblocked by the second flags; and determining a position correction for at least one of the first robot configuration and the second robot configuration in response to recording measured positions in space where at least one of the first beam sensors are blocked and unblocked by the first flags and at least one of the second beam sensors are blocked and unblocked by the second flags.

2. The method of claim 1, comprising:

extending the dual-bladed robot in a third robot configuration with the second end effector extended and the first end effector retracted, and recording measured positions in space where the second beam sensors are blocked and unblocked by the second flags.

3. The method of claim 1, comprising providing the first flags on a first wrist member of the one of the first moveable arms.

4. The method of claim 1, comprising providing the second flags on a second wrist member of the one of the second moveable arms.

5. The method of claim 1, comprising:

providing the first flags as a first flag component coupled to a surface of a first wrist member of the one of the first moveable arms.

6. The method of claim 1, comprising:

providing the second flags as a second flag component coupled to a surface of a second wrist member of the one of the second moveable arms.

7. The method of claim 1, comprising:

Providing the first flags at a position on a first wrist member of the one of the first moveable arms that is positioned forward of the first beam sensors when the first end effector is fully extended into a chamber.

8. The method of claim 1, comprising:

providing the second flags at a position on a second wrist member of the one of the second moveable arms that is positioned forward of the second beam sensors when the second end effector is fully extended into a chamber.

9. The method of claim 1, comprising:

providing the first flags and the second flags at positions directly proximate a position of a substrate on the first end effector and the second end effector.

10. The method of claim 1 comprising determining the position correction for both of the first robot configuration and the second robot configuration.

11. A dual-bladed robot calibration system, comprising:

a dual-bladed robot including first moveable arms and a first end effector attached to one of the first moveable arms, and second moveable arms and a second end effector attached to one of the second moveable arms, wherein the first end effector and second end effector are independently moveable;

first flags disposed on one of the first moveable arms or the first end effector;

second flags disposed on one of the second moveable arms or the second end effector;

first beam sensors provided proximate to a first process location;

second beam sensors provided proximate to a second process location; and a controller coupled to the dual-bladed robot and operatively configured to:

move the dual-bladed robot to a first robot configuration with the first end effector extended and the second end effector retracted and record measured positions where the first beam sensors are blocked and unblocked by the first flags, move the dual-bladed robot to a second robot configuration with both of the first end effector and the second end effector extended and record measured positions where the first beam sensors are blocked and unblocked by the first flags and where the second beam sensors are blocked and unblocked by the second flags, and determining a position correction for at least one of the first robot configuration and the second robot configuration in response to recording measured positions in space where at least one of the first beam sensors are blocked and unblocked by the first flags and at least one of the second beam sensors are blocked and unblocked by the second flags.

12. The dual-bladed robot calibration system of claim 11, wherein the first flags are provided on a first wrist member of the one of the first moveable arms.

13. The dual-bladed robot calibration system of claim 11, wherein the second flags are provided on a second wrist member of the one of the second moveable arms.

14. The dual-bladed robot calibration system of claim 11, comprising attaching the first flags as part of a first flag component coupled to a surface of a first wrist member of the one of the first moveable arms.

15. The dual-bladed robot calibration system of claim 11, comprising attaching the second flags as part of a second flag component coupled to a surface of a second wrist member of the one of the second moveable arms.

16. The dual-bladed robot calibration system of claim 11, wherein the first flags are located at a position on a first wrist member of the one of the first moveable arms that is positioned forward of the first beam sensors when the first end effector is fully extended into a chamber.

17. The dual-bladed robot calibration system of claim 11, wherein the second flags are located at a position on a second wrist member of the one of the second moveable arms that is positioned forward of the second beam sensors when the second end effector is fully extended into a chamber.

18. The dual-bladed robot calibration system of claim 11, wherein the first flags and the second flags are located at positions directly proximate a position of a substrate on the first end effector and the second end effector.

19. The dual-bladed robot calibration system of claim 11 comprising multiple flags at spaced intervals along a length of a first wrist member and second wrist member.

20. The A dual-bladed robot calibration system of claim 11, wherein at least one of the first flags and the second flags include a first portion and a second portion extending from opposing sides of one of the moveable arms or the end effector, wherein the first portion includes a first leading edge and the second portion includes a second leading edge, and wherein the first leading edge is non-parallel to the second leading edge.

21. An electronic device processing system, comprising:
- a robot including moveable arms and an end effector attached to one of the moveable arms, and a first flag and a second flag disposed on opposite sides of one of the moveable arms or the end effector, the first flag including a first leading edge and the second flag including a second leading edge, wherein the first leading edge is non-parallel to the second leading edge, wherein the end effector is moveable in translation;
- a chamber adapted to be serviced by the end effector;
- beam sensors positioned at distances from the chamber; and
- a controller coupled to the robot and operatively configured to:
  - cause movement of the robot to a robot configuration with the end effector extended into the chamber and record blocked and unblocked transition locations where the beam sensors are blocked and unblocked by the first flag and the second flag, and
  - determine a position correction relative to a calibrated position for the robot configuration in response to recording the blocked and unblocked transition locations of the first flag and the second flag including determining expected position in space of the end effector based on the recorded transition locations and comparing the expected position of the end effector to the calibrated position.

22. A method of correcting misalignment in a robot, comprising;
- providing the robot including moveable arms and an end effector attached to one of the moveable arms, and a first flag and a second flag disposed on opposite sides of the moveable arms or the end effector, the first flag including a first leading edge and the second flag including a second leading edge, wherein the first leading edge is non-parallel to the second leading edge;
- providing a controller coupled to the robot and operatively configured to control movement and record positions of the end effector;
- providing a chamber adapted to be serviced by the end effector;
- providing beam sensors positioned at distances from the chamber;
- moving the robot to a robot configuration with the end effector extended into the chamber;
- recording blocked and unblocked transition locations where the beam sensors are blocked and unblocked by the first flag and the second flag; and
- determining a position correction relative to a calibrated position for the robot configuration in response to recording the blocked and unblocked transition locations of the first flag and the second flag including determining expected position in space of the end effector based on the recorded transition locations and comparing the expected position of the end effector to the calibrated position.

* * * * *